United States Patent
Yasuda et al.

(10) Patent No.: US 10,883,451 B2
(45) Date of Patent: Jan. 5, 2021

(54) FUEL VAPOR TREATMENT APPARATUS

(71) Applicant: TOYOTA JIDOSHA KABUSHIKI KAISHA, Toyota (JP)

(72) Inventors: Hiromichi Yasuda, Toyota (JP); Tatsuhiko Akita, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/601,954

(22) Filed: Oct. 15, 2019

(65) Prior Publication Data
US 2020/0132024 A1    Apr. 30, 2020

(30) Foreign Application Priority Data
Oct. 26, 2018   (JP) ................... 2018-201493

(51) Int. Cl.
*F02M 25/08*  (2006.01)
*F02D 41/00*  (2006.01)
*F02M 37/00*  (2006.01)

(52) U.S. Cl.
CPC ....... *F02M 25/0836* (2013.01); *F02D 41/003* (2013.01); *F02M 37/0029* (2013.01)

(58) Field of Classification Search
CPC .............. F02M 25/08; F02M 25/0809; F02M 25/0836; F02M 37/00; F02M 37/0029; F02D 41/00; F02D 41/003; B60K 15/03; B60K 15/0354

USPC .................................. 123/518–520
See application file for complete search history.

(56) References Cited

U.S. PATENT DOCUMENTS

| | | | |
|---|---|---|---|
| 2013/0199504 A1 | 8/2013 | Takeishi et al. | |
| 2015/0083087 A1* | 3/2015 | Pearce | F02M 25/0809 123/520 |
| 2018/0178645 A1* | 6/2018 | Dudar | B60K 15/077 |
| 2018/0209359 A1* | 7/2018 | Dudar | F02D 41/004 |
| 2020/0149482 A1* | 5/2020 | Dudar | F02M 25/089 |

FOREIGN PATENT DOCUMENTS

JP    2013-160108    8/2013

* cited by examiner

*Primary Examiner* — John Kwon
*Assistant Examiner* — Johnny H Hoang
(74) *Attorney, Agent, or Firm* — Finnegan, Henderson, Farabow, Garrett & Dunner, LLP (57) ABSTRACT

In a fuel vapor treatment apparatus, when an internal combustion engine is in non-turbocharging operation, a controller is configured to open a first valve and a second valve, and when the internal combustion engine is in turbocharging operation, the controller is configured to close the first valve, and to open a third valve based on pressure in a fuel tank detected by a first pressure detector.

5 Claims, 6 Drawing Sheets

FUEL VAPOR TREATMENT APPARATUS

CROSS-REFERENCE TO RELATED APPLICATION

This application is based upon and claims the benefit of priority of the prior Japanese Patent Application No. 2018-201493, filed on Oct. 26, 2018, the entire contents of which are incorporated herein by reference.

TECHNICAL FIELD

The present disclosure relates to a fuel vapor treatment apparatus.

BACKGROUND

Evaporated fuel (fuel vapor) is generated in a fuel tank storing fuel of an internal combustion engine. The fuel vapor is temporarily adsorbed to a canister. The adsorbed fuel vapor is purged from the canister to an intake passage by use of negative pressure in the intake passage, and then is burned in the internal combustion engine. However, in an internal combustion engine equipped with a turbocharger, it is difficult to purge the fuel vapor by use of negative pressure during turbocharging operation. Accordingly, the fuel vapor is accumulated in the fuel tank, which increases the pressure in the fuel tank. Thus, there is a technique in which an ejector is provided in the intake passage and the fuel vapor is purged to the intake passage by activating the ejector during the turbocharging operation (See, Japanese Unexamined Patent Application Publication No. 2013-160108).

However, as for the system in Japanese Unexamined Patent Application Publication No. 2013-160108, the configuration is complex, and the number of parts is large. This increases cost and makes it difficult to ensure a space for mounting the system in the engine compartment.

SUMMARY

It is therefore an object of the present disclosure to provide an fuel vapor treatment apparatus which has low cost and good mountability and is capable of relieving pressure from a fuel tank. The above object is achieved by a fuel vapor treatment apparatus including: a fuel tank storing fuel of an internal combustion engine provided with a turbocharger; an adsorption unit adsorbing fuel vapor generated in the fuel tank; a first passage connecting the fuel tank and the adsorption unit; a first valve provided in the first passage; a purge passage connected between the first passage, between the adsorption unit and the first valve, and an intake passage of the internal combustion engine at a downstream side of a throttle valve; a check valve provided in the purge passage and opening in response to negative pressure in the intake passage; a second valve provided in the purge passage and positioned between the adsorption unit and the check valve; a second passage connected between the fuel tank and the intake passage at an upstream side of the turbocharger; a third valve provided in the second passage; a first pressure detector configured to detect pressure in the fuel tank; and a controller configured to control the first valve and the second valve, wherein when the internal combustion engine is in non-turbocharging operation, the controller is configured to open the first valve and the second valve, and when the internal combustion engine is in turbocharging operation, the controller is configured to close the first valve, and to open the third valve based on the pressure in the fuel tank detected by the first pressure detector.

DETAILED DESCRIPTION

First Embodiment

Figure 1:
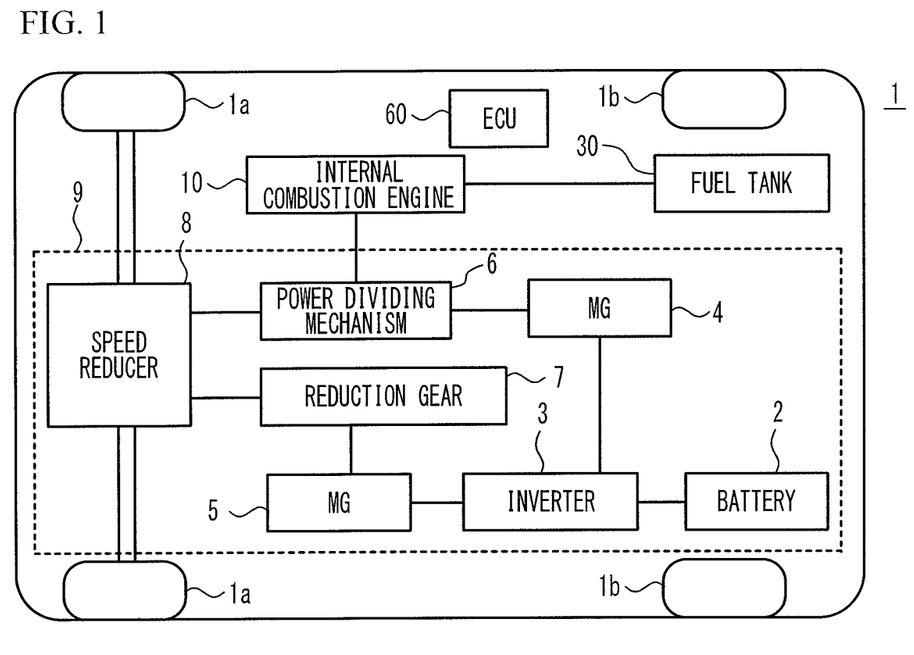
FIG. 1 is a schematic view exemplary illustrating a vehicle.

Hereinafter, a description will be given of a fuel vapor treatment apparatus according to a present embodiment with reference to the drawings. FIG. 1 is a schematic view exemplary illustrating a vehicle 1, and the fuel vapor treatment apparatus is applied to the vehicle 1. As illustrated in FIG. 1, the vehicle 1 is a hybrid vehicle equipped with a hybrid system 9 and an internal combustion engine 10 (engine), and has drive wheels 1a and 1b. The vehicle 1 may be a plug-in hybrid vehicle in which a battery 2 is chargeable with an external power supply. The internal combustion engine 10 is, for example, a gasoline engine or a diesel engine, and burns the fuel supplied from a fuel tank 30 to generate power.

The hybrid system 9 includes the battery 2, an inverter 3, motor generators (MG) 4 and 5, a power dividing mechanism 6, a reduction gear 7, and a speed reducer 8. The MGs 4 and 5 have a motor function (power running) and a power generation function (regeneration), and are connected to the battery 2 via the inverter 3.

The power dividing mechanism 6 is composed of a planetary gear mechanism including, for example, a sun gear, a planetary gear, and a ring gear. The power dividing mechanism 6 is connected to the internal combustion engine 10 and the MG 4, and is connected to the drive wheels 1a via the speed reducer 8. The power output from the internal combustion engine 10 is divided and transmitted to the drive wheels 1a and the MG 4 by the power dividing mechanism 6. The reduction gear 7 is connected to the MG 5, and is connected to the drive wheels 1a via the speed reducer 8. The power output from the MG 5 is transmitted to the drive wheels 1a via the reduction gear 7 and the speed reducer 8.

Direct current power discharged by the battery 2 is converted into alternating current power by the inverter 3, and then is supplied to the MG 4 or 5. In charging the battery 2, alternating current power generated by the MG 4 or 5 is converted into direct current power by the inverter 3, and then is supplied to the battery 2. The battery 2 may be connected with a converter that steps up and steps down the power.

An electric control unit (ECU) 60 controls the internal combustion engine 10 and the hybrid system 9, and further controls the fuel vapor treatment apparatus as described later.

(Fuel Vapor Treatment System)

Figure 2:
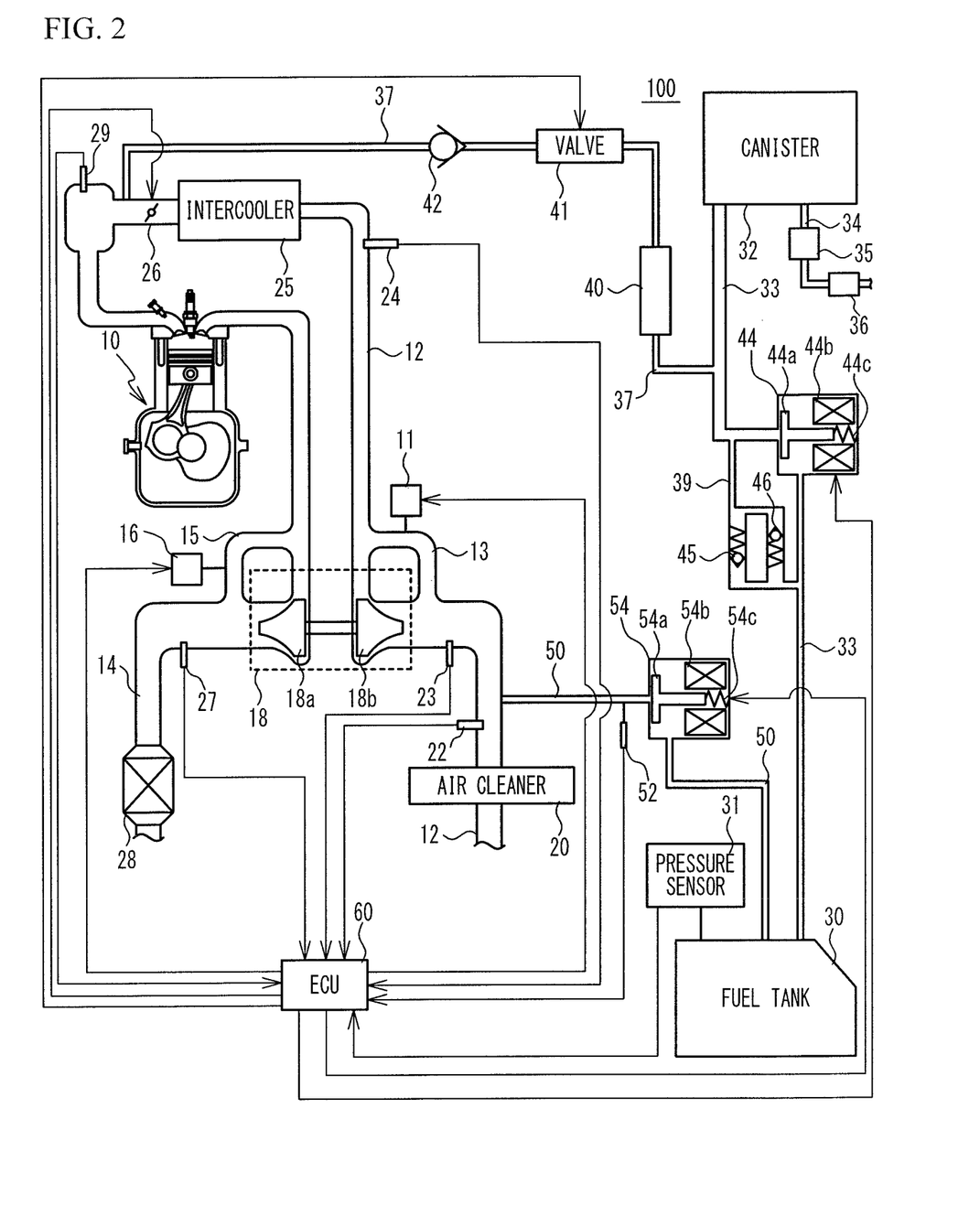
FIG. 2 is a schematic view exemplary illustrating an fuel vapor treatment apparatus according to a first embodiment.

FIG. 2 is a schematic view exemplary illustrating a fuel vapor treatment apparatus 100 according to the first embodiment. The fuel vapor treatment apparatus 100 is applied to the internal combustion engine 10, and includes the fuel tank 30, a pressure sensor 31 (first pressure detector), a canister 32 (adsorption unit), valves 41, 44 and 54, a check valve 42, and the ECU 60.

The internal combustion engine 10 is connected with an intake passage 12 and an exhaust passage 14. An air cleaner 20, an air flow meter 22, a pressure sensor 23 (second pressure detector), a pressure sensor 24, an intercooler 25, a throttle valve 26, and a pressure sensor 29 are provided in this order from the upstream side in the intake passage 12. An air-fuel ratio sensor 27 and a catalyst 28 are provided in this order from the upstream side in the exhaust passage 14.

A turbocharger 18 includes a turbine 18a and a compressor 18b connected to each other. The turbine 18a is located in the exhaust passage 14 at the upstream side of the air-fuel ratio sensor 27. The compressor 18b is located in the intake passage 12 at the downstream side of the pressure sensor 23 and at the upstream side of the pressure sensor 24. A bypass passage 13 bypassing the compressor 18b is connected to the intake passage 12. A valve 11 is provided in the bypass passage 13. A bypass passage 15 bypassing the turbine 18a is connected to the exhaust passage 14. A valve 16 is provided in the bypass passage 15.

The intake air passes through the intake passage 12, is purified by the air cleaner 20, is cooled by the intercooler 25, and is introduced into a combustion chamber of the internal combustion engine 10. Fuel is supplied to a fuel injection valve from the fuel tank 30 by use of a pump not illustrated. The fuel injection valve injects fuel to form an air-fuel mixture of the intake air and the fuel. The air-fuel mixture is burned in the internal combustion engine 10, and the exhaust gas caused by the combustion is discharged to the exhaust passage 14. The exhaust gas is purified by the catalyst 28 in the exhaust passage 14, and is discharged. The catalyst 28 is, for example, a three-way catalyst, and purifies CO, HC, NOx and the like in the exhaust gas.

When the turbine 18a is rotated by the exhaust gas, the compressor 18b connected to the turbine 18a is also rotated, which compresses the intake air. Thus, the pressure of the intake air at the downstream side of the compressor 18b becomes higher than that of the intake air at the upstream side.

The pressure sensor 23 detects the pressure of the intake air at the upstream side of the turbocharger 18. The pressure sensor 24 detects the pressure of the intake air at the downstream side of the turbocharger 18. The pressure sensor 29 detects the pressure of the intake air at the downstream side of the throttle valve 26. The air flow meter 22 detects the flow rate of the intake air. The flow rate of the intake air changes in response to an opening degree of the throttle valve 26. The air-fuel ratio sensor 27 detects an air-fuel ratio of the air-fuel mixture.

The fuel tank 30 stores fuel such as gasoline. The fuel is evaporated in the fuel tank 30, which generates the evaporated fuel (fuel vapor). The valves 44 and 54 described later close to seal the fuel tank 30, which configures a so-called sealed tank. Passages 33 and 50 are connected to the fuel tank 30, and the pressure sensor 31 is provided therein. The pressure sensor 31 detects the pressure in the fuel tank 30.

The passage 33 (first passage) connects the fuel tank 30 and the canister 32. The valve 44 (first valve) is provided between the fuel tank 30 and the canister 32 in the passage 33. The valve 44 is a normally closed solenoid valve including a valve body 44a, a solenoid 44b, and a pressing member 44c. In not energizing the solenoid 44b, the pressing member 44c presses the valve body 44a to close the valve 44. In energizing the solenoid 44b, the electromagnetic force is generated, and then the valve body 44a moves against the biasing force of the pressing member 44c. Thus, the valve 44 opens.

The passage 33 is connected with a passage 39 that connects between the upstream side and the downstream side of the valve 44. The passage 39 is branched into two parts, one of two parts is provided with a relief valve 45, and the other of two parts is provided with a relief valve 46. The relief valve 45 permits the gas to flow from the fuel tank 30 to the subsequent stage of the valve 44 and prohibits the gas to flow in the reverse direction. The relief valve 46 permits the gas to flow to the fuel tank 30 and prohibits the gas to flow in the reverse direction.

The canister 32 includes an adsorbent such as activated carbon, and adsorbs the fuel vapor flowing from the fuel tank 30 through the passage 33. One end of a passage 34 is connected to the canister 32, and the other end is released to the atmosphere. A pump 35 and a filter 36 are provided in the passage 34.

One end of a purge passage 37 is connected to a first point in the passage 33 between the canister 32 and the valve 44. The first point is at the downstream side of a second point where the passage 39 is connected to the passage 33 at the downstream side of the valve 44. The other end of the purge passage 37 is connected to the intake passage 12 at the downstream side of the throttle valve 26. A purge buffer 40, a valve 41 (second valve), and the check valve 42 are provided in the purge passage 37 in this order from the canister 32.

The purge buffer 40 includes an adsorbent that is the same kind as the canister 32. The valve 41 is, for example, a normally closed solenoid valve, which is in a closing state at the time of being not energized and in an opening state at the time of being energized. The check valve 42 permits the gas to flow from the canister 32 to the intake passage 12, and prohibits the gas from the intake passage 12 to the canister 32. In non-turbocharging operation, the check valve 42 prohibits the supercharged intake air to flow to the canister 32 and the fuel tank 30.

One end of the passage 50 (second passage) is connected to the fuel tank 30, and the other end is connected to the intake passage 12 between the air cleaner 20 and the compressor 18b. The valve 54 (third valve) and a pressure sensor 52 are provided in the passage 50 in this order from the fuel tank 30. The pressure sensor 52 detects the pressure in the passage 50. It is possible to detect, for example, an abnormality such as detachment of the passage 50 on the basis of the detected pressure.

The valve 54 is a normally closed solenoid valve including a valve body 54a, a solenoid 54b, and a pressing member 54c. In not energizing the solenoid 54b, the pressing member 54c presses the valve body 54a to close the valve 54. In energizing the solenoid 54b, the electromagnetic force is generated, and then the valve body 54a moves against the biasing force of the pressing member 54c. Thus, the valve 54 opens.

The ECU 60 includes a central processing unit (CPU), and storage devices such as a random access memory (RAM) and a read only memory (ROM). The ECU 60 achieves various controls by executing programs stored in the storage device, such as the ROM. The ECU 60 adjusts each opening degree of the valves 11, 16, 44, and 54 and the throttle valve 26. The ECU 60 causes the internal combustion engine 10 to execute natural intake operation (natural aspiration (NA) operation, non-turbocharging operation) that does not execute intake turbocharging by, for example, fully closing the valves 11 and 16, and to execute turbocharging operation by the turbocharger 18 by opening the valves 11 and 16.

Further, the ECU 60 obtains the flow rate of the intake air from the air flow meter 22, obtains the air-fuel ratio from the air-fuel ratio sensor 27, obtains the pressure in the intake passage 12 from the pressure sensors 23, 24 and 29, and obtains the pressure in the fuel tank 30 from the pressure sensor 31. In the present embodiment, the atmospheric pressure includes not only the pressure in the atmosphere but also the pressure of the intake air fluctuating after passing through the intake passage 12 and the air cleaner 20 or the like. Negative pressure is lower than the atmospheric pressure. The supercharging pressure is the pressure after being supercharged by the turbocharger 18, which is higher than the atmospheric pressure.

(Purge of Fuel Vapor)

Next, the purge of the fuel vapor will be described. When the ECU 60 detects, for example, an opening operation of a fuel lid not illustrated at the time of refueling, the ECU 60 opens the valve 44. Therefore, the gas in the fuel tank 30 flows to the canister 32 through the passage 33. The fuel vapor in the gas is adsorbed to the canister 32, and the components (atmospheric components) other than the fuel vapor are discharged from the passage 34 to the atmosphere.

During the NA operation, the pressure in the intake passage 12 at a downstream side of the throttle valve 26 becomes negative pressure lower than the atmospheric pressure. This causes the check valve 42 to open, and the ECU 60 opens the valve 41. Accordingly, the fuel vapor flows from the canister 32 into the intake passage 12 through the purge passage 37, and then is supplied to the internal combustion engine 10. Further, when the ECU 60 opens the valve 44, the fuel vapor in the fuel tank 30 is supplied to the internal combustion engine 10 through the passage 33 and the purge passage 37 without being adsorbed in the canister 32. The purge buffer 40 adsorbs a part of the fuel vapor, thereby suppressing a rapid increase in the fuel vapor in the intake passage 12. Although the valve 54 may open or close, the valve 54 preferably closes in order to prevent the fuel vapor from being discharged out of the fuel tank 30.

During the turbocharging operation, the compressor 18b supercharges the intake air, and then the pressure in the intake passage 12 at the downstream side of the compressor 18b becomes supercharging pressure higher than the atmospheric pressure. For this reason, purge of the fuel vapor using negative pressure is not performed. The valve 44 closes, which suppresses the adsorption of the fuel vapor to the canister 32 and the release of the fuel vapor to the atmosphere through the passage 34. As described later, the valve 54 switches between an opening state and an closing state in response to the pressure (internal pressure) in the fuel tank 30. Since the check valve 42 closes to suppress the supercharged intake air from flowing from the purge passage 37 to the passage 33, the valve 41 may open or close.

As illustrated in FIG. 1, the vehicle 1 is a hybrid vehicle, and the operating frequency of the internal combustion engine 10 is low, as compared with a gasoline vehicle or the like. That is, since the internal combustion engine 10 stops while the vehicle 1 is traveling by a motor, it is also difficult to purge the fuel vapor by use of negative pressure like during the NA operation. At this time, the valves 44 and 54 close to seal the fuel tank 30. The fuel vapor is enclosed in the fuel tank 30 to suppress leakage and an offensive smell. On the other hand, the fuel tank 30 is sealed, so that the fuel vapor increases the internal pressure in the fuel tank 30.

In the turbocharging hybrid system including the hybrid system 9 and the turbocharger 18 as in the vehicle 1, the purge frequency is lower than that of a gasoline car or the like. Since the internal combustion engine 10 stops while the motor is traveling as described above, the purge is not performed. Further, even when the internal combustion engine 10 is in operation, it is difficult to purge the fuel vapor by use of negative pressure during the turbocharging operation. This tends to elongate the time during which the fuel tank 30 is sealed by closing the valve 44, and the internal pressure tends to increase. The internal pressure tends to further increase, particularly in high temperature environment. In order to suppress damage to the fuel tank 30, the pressure is relieved in the present embodiment.

(Pressure Relief Control)

Figure 3:
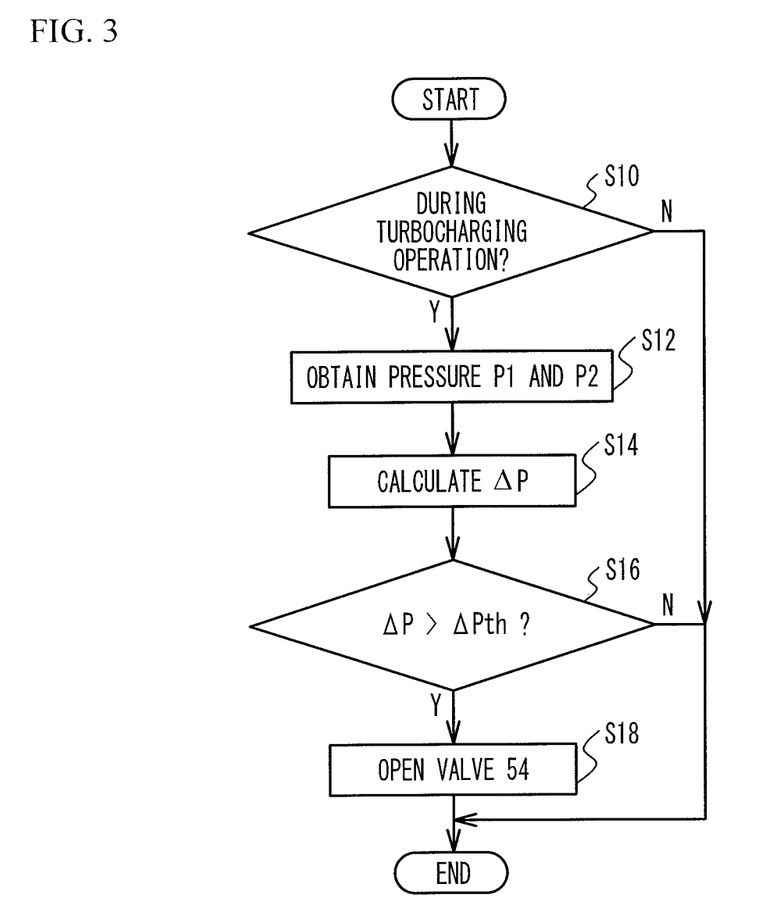
FIG. 3 is a flowchart illustrating control executed by an ECU.

FIG. 3 is a flowchart illustrating the control executed by the ECU 60. As illustrated in FIG. 3, the ECU 60 determines whether or not the turbocharging operation is performed (step S10). For example, when each opening degree of the valves 11 and 16 is zero, the non-turbocharging operation is performed. When each opening degree is larger than zero, the turbocharging operation is performed. When a negative determination is made (No), the control ends, and for example, the purge is performed during the NA operation. When an affirmative determination is made (Yes), the ECU 60 obtains the pressure P1 in the intake passage 12 detected by the pressure sensor 23 and the pressure P2 in the fuel tank 30 detected by the pressure sensor 31 (step S12).

The ECU 60 calculates a difference $\Delta P$ (=P2−P1) between the pressure P2 and the pressure P1 (step S14), and determines whether or not $\Delta P$ is larger than a threshold value $\Delta P$th (first value) (step S16). When a negative determination is made, the control ends. When an affirmative determination is made, the ECU 60 energizes the solenoid 54b of the valve 54 to open the valve 54 (step S18). Thus, the gas containing the fuel vapor in the fuel tank 30 flows from the high-pressure fuel tank 30 into the low-pressure intake passage 12 through the passage 50. The fuel vapor is introduced into the internal combustion engine 10 and then burns. Since the intake air amount is larger during the turbocharging operation than during the NA operation, the air-fuel ratio slightly changes due to the introduction of the purge. After step S18, the control ends.

Figure 4:
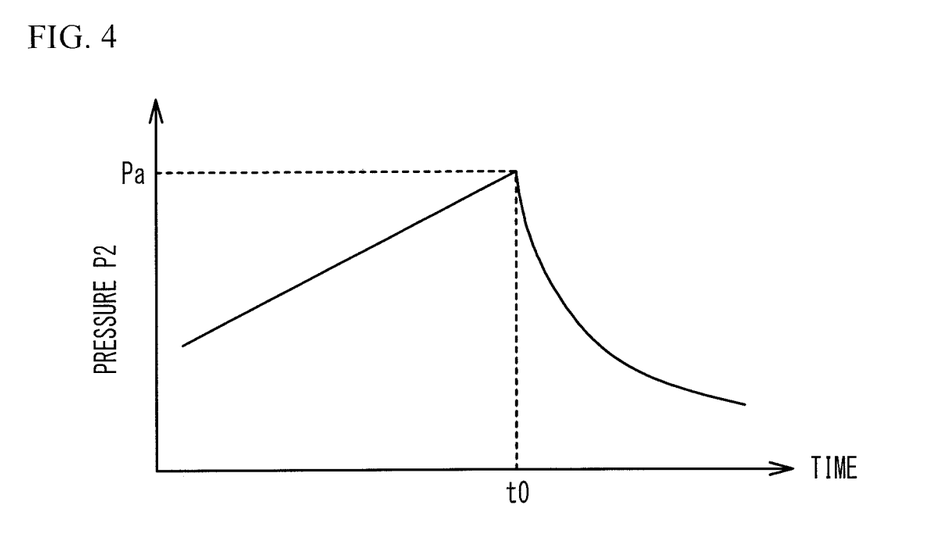
FIG. 4 is a view exemplary pressure.

FIG. 4 is a view exemplarily illustrating pressure. A horizontal axis indicates time, and a vertical axis indicates the pressure P2 in the fuel tank 30. Until time to, the valves 44 and 54 close to seal the fuel tank 30, and then the pressure P2 increases. The pressure P2 reaches Pa at time t0, and the pressure difference $\Delta P$ becomes larger than $\Delta P$th. At this time, the ECU 60 opens the valve 54 to relieve the pressure from the fuel tank 30, and then the pressure P2 decreases after time t0. Pa is, for example, 1.2 times or more, or 1.5 times or more of the atmospheric pressure. When the pressure P2 decreases to about the atmospheric pressure, the ECU 60 closes the valve 54.

In the first embodiment, the purge is performed by use of the negative pressure of the intake passage 12 during the non-turbocharging operation. On the other hand, during the turbocharging operation, the ECU 60 opens the valve 54 based on the pressure P2 in the fuel tank 30. As a result, the pressure is relieved from the fuel tank 30, which suppresses the damage to the fuel tank 30 due to the increase in internal pressure therein. The fuel vapor treatment apparatus 100 includes the passage 50 and the valve 54 located between the fuel tank 30 and the intake passage 12. The number of parts of the fuel vapor treatment apparatus 100 is small and the configuration thereof is simple, as compared with, for example, a turbocharging purge system using plural pipes and the like. This reduces the cost and improves the mountability.

The pressure P1 is, for example, the atmospheric pressure. On the other hand, the pressure P2 becomes high, for example, the pressure P2 becomes 1.2 times or more, or 1.5 times or more of P1, when the fuel tank 30 is sealed. The threshold value ΔPth is a value corresponding to the pressures P1 and P2 described above. When the pressure P2 is higher than P1 by ΔPth or more, the ECU 60 opens the valve 54 to relieve the pressure. Therefore, P2 is maintained from P1 to ΔPth, thereby suppressing the damage to the fuel tank 30 due to an increase in internal pressure.

The vehicle 1 illustrated in FIG. 1 is the vehicle equipped with the turbocharging hybrid system, and the purge using negative pressure is not performed during motor traveling and during the turbocharging operation. Since the fuel tank 30 is sealed during this period, the internal pressure tends to increase. In the first embodiment, the valve 54 opens to enable relief of the pressure from the fuel tank 30 even during the turbocharging operation. Additionally, the vehicle 1 is equipped with the hybrid system 9, the internal combustion engine 10, and the turbocharger 18, but the configuration is not limited to this. The vehicle may be a vehicle other than a hybrid vehicle such as a gasoline vehicle and a diesel vehicle, and the fuel vapor treatment apparatus 100 is applicable to an internal combustion engine with a turbocharger.

Second Embodiment

Figure 5:
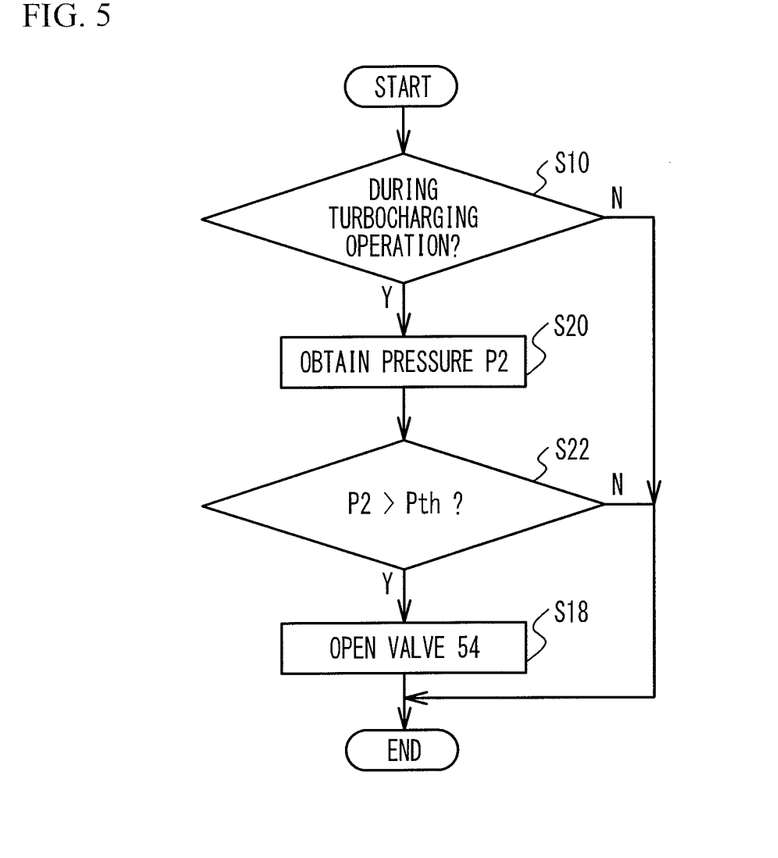
FIG. 5 is a flowchart illustrating control executed by the ECU.

The description of the same configuration as that of the first embodiment is omitted. The configurations of FIGS. 1 and 2 are common to a second embodiment. FIG. 5 is a flowchart illustrating the control executed by the ECU 60. As illustrated in FIG. 5, in the second embodiment, steps S20 and S22 are executed instead of steps S12 to S16 of FIG. 2. The ECU 60 obtains the pressure P2 in the fuel tank 30 from the pressure sensor 31 (step S20), and determines whether or not the pressure P2 is larger than the threshold. ΔPth (step S22). When a negative determination is made, the control ends. When an affirmative determination is made, the ECU 60 opens the valve 54 (step S18).

In the second embodiment, the ECU 60 opens the valve 54, when the pressure P2 in the fuel tank 30 is higher than ΔPth during the turbocharging operation. Thus, like the first embodiment, the fuel vapor treatment apparatus has low cost and good mountability to the vehicle 1, and it is also possible to relieve the pressure from the fuel tank 30. The threshold value ΔPth is higher than the pressure P1 at the upstream side of the intake passage 12, and may be, for example, 1.2 times or more, or 1.5 times or more of the atmospheric pressure, or lower than the pressure at which the fuel tank 30 might be damaged. The pressure is relieved when the pressure P2 reaches ΔPth, thereby suppressing the damage to the fuel tank 30.

Third Embodiment

Figure 6:
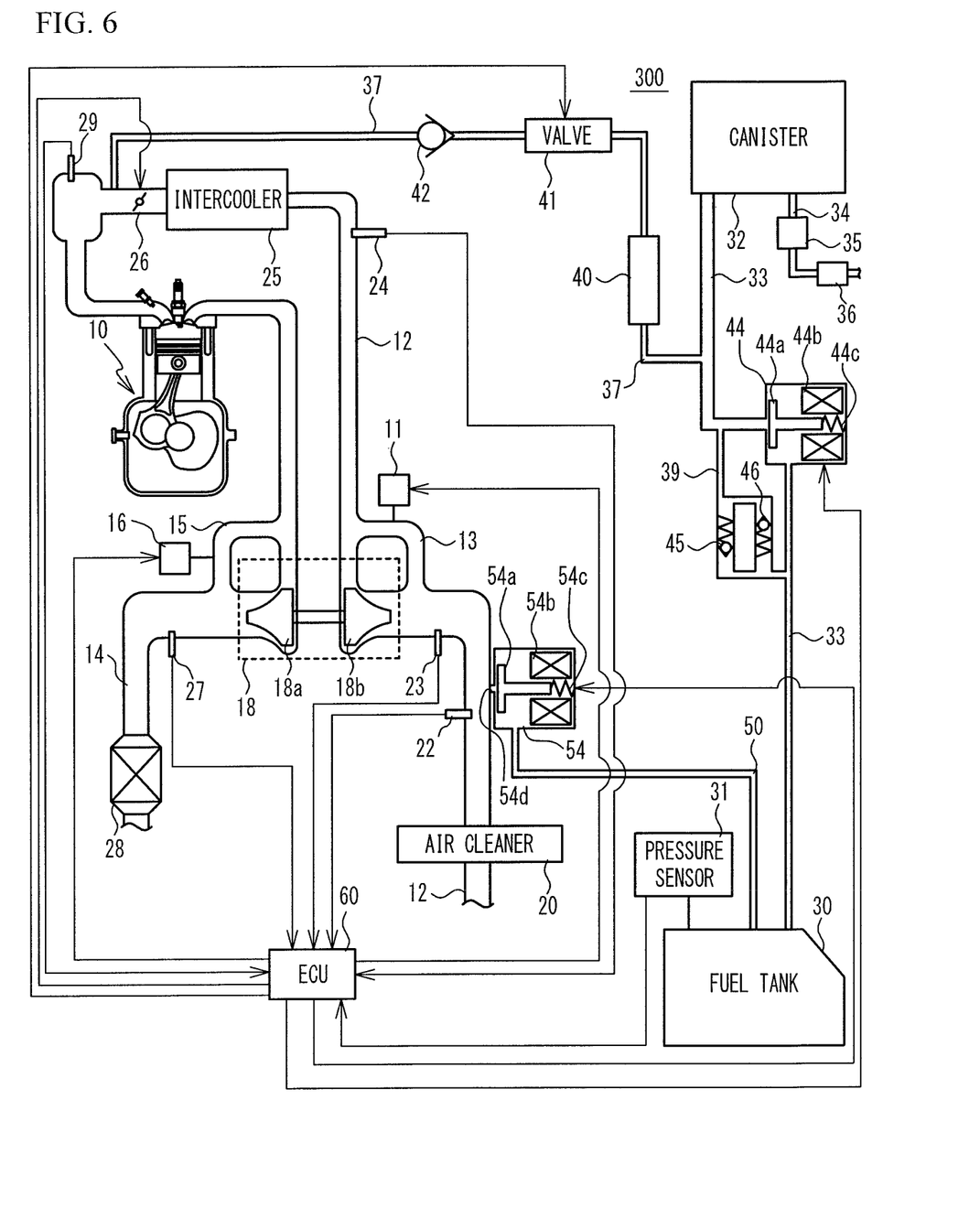
FIG. 6 is a schematic view exemplary illustrating an fuel vapor treatment apparatus according to a third embodiment.

The description of the same configuration as that of the first embodiment is omitted. The configuration of FIG. 1 is also common to a third embodiment. FIG. 6 is a schematic view exemplary illustrating a fuel vapor treatment apparatus 300 according to the third embodiment. As illustrated in FIG. 6, a port 54d of the valve 54 is attached to the intake passage 12 without using a pipe, thereby eliminating the pressure sensor 52, illustrated in FIG. 2, for detecting the pipe detachment. This further reduces the cost. In order to prevent the detachment of the valve 54, the valve 54 and the intake passage 12 may be integrally formed.

Although some embodiments of the present disclosure have been described in detail, the present disclosure is not limited to the specific embodiments but may be varied or changed within the scope of the present disclosure as claimed.

What is claimed is:

1. A fuel vapor treatment apparatus comprising:
   a fuel tank storing fuel of an internal combustion engine provided with a turbocharger;
   an adsorption unit adsorbing fuel vapor generated in the fuel tank;
   a first passage connecting the fuel tank and the adsorption unit;
   a first valve provided in the first passage;
   a purge passage connected between the first passage, between the adsorption unit and the first valve, and an intake passage of the internal combustion engine at a downstream side of a throttle valve;
   a check valve provided in the purge passage and opening in response to negative pressure in the intake passage;
   a second valve provided in the purge passage and positioned between the adsorption unit and the check valve;
   a second passage connected between the fuel tank and the intake passage at an upstream side of the turbocharger;
   a third valve provided in the second passage;
   a first pressure detector configured to detect pressure in the fuel tank; and
   a controller configured to control the first valve and the second valve,
   wherein
   when the internal combustion engine is in non-turbocharging operation, the controller is configured to open the first valve and the second valve, and
   when the internal combustion engine is in turbocharging operation, the controller is configured to close the first valve, and to open the third valve based on the pressure in the fuel tank detected by the first pressure detector.

2. The fuel vapor treatment apparatus according to claim 1, further comprising a second pressure detector configured to detect pressure in the intake passage at an upstream side of the turbocharger,
   wherein when the internal combustion engine is in the turbocharging operation and when the pressure in the fuel tank is higher than the pressure in the intake passage at the upstream side of the turbocharger by a first value or more, the controller is configured to open the third valve.

3. The fuel vapor treatment apparatus according to claim 1, wherein when the internal combustion engine is in the turbocharging operation and the pressure in the fuel tank is equal to or higher than a second value, the controller is configured to open the third valve.

4. The fuel vapor treatment apparatus according to claim 1, wherein one port of the third valve is attached to the intake passage without using a pipe.

5. The fuel vapor treatment apparatus according to claim 1, wherein
   the internal combustion engine is mounted on a hybrid vehicle, and while a motor of the hybrid vehicle is traveling, the internal combustion engine stops and the controller is configured to close the first valve.

* * * * *